(12) United States Patent
Abdelhamed et al.

(10) Patent No.: US 12,293,497 B2
(45) Date of Patent: May 6, 2025

(54) ELECTRONIC DEVICE FOR ESTIMATING CAMERA ILLUMINANT AND METHOD OF THE SAME

(71) Applicant: SAMSUNG ELECTRONICS CO., LTD., Suwon-si (KR)

(72) Inventors: Abdelrahman Abdelhamed, Toronto (CA); Abhijith Punnappurath, Mountain View (CA); Michael Scott Brown, Mountain View (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 42 days.

(21) Appl. No.: 18/105,660

(22) Filed: Feb. 3, 2023

(65) Prior Publication Data
US 2023/0188690 A1 Jun. 15, 2023

Related U.S. Application Data

(63) Continuation of application No. PCT/KR2021/016244, filed on Nov. 9, 2021, which
(Continued)

(51) Int. Cl.
*G06T 5/92* (2024.01)
*G06T 3/40* (2024.01)
(Continued)

(52) U.S. Cl.
CPC ............... *G06T 5/92* (2024.01); *G06T 3/40* (2013.01); *G06T 7/11* (2017.01); *G06T 7/30* (2017.01);
(Continued)

(58) Field of Classification Search
CPC ..... G06T 5/92; G06T 3/40; G06T 7/11; G06T 7/30; G06T 7/90; G06T 2207/10024;
(Continued)

(56) References Cited

U.S. PATENT DOCUMENTS 7,136,524 B1 * 11/2006 Goh .................. G06V 10/56
382/167
8,611,660 B2 12/2013 Finlayson et al.
(Continued)

FOREIGN PATENT DOCUMENTS

CN 106204500 A 12/2016
CN 106791731 A 5/2017
(Continued)

OTHER PUBLICATIONS

Gao, S., et al., "Improving color constancy by discounting the variation of camera spectral sensitivity", Journal of the Optical Society of America A, vol. 34, No. 8, (Aug. 2017), pp. 1448-1462, 15 pages.
(Continued)

*Primary Examiner* — Timothy J Henn
(74) *Attorney, Agent, or Firm* — Sughrue Mion, PLLC

(57) ABSTRACT

A method for processing image data may include: obtaining a first image and a second image that capture a same scene in different views, from a first camera and a second camera, respectively; spatially aligning the first image with the second image; obtaining a color transformation matrix that maps the first image to the second image based on color values of the first image and the second image; obtaining an estimated illuminant color from an output of a neural network by inputting the color transformation matrix to the neural network, wherein the neural network is trained based on a pair of reference images of a same reference scene with a color rendition chart that are captured by different cameras having different spectral sensitivities; and performing a white balance correction on the first image based on the estimated illuminant color to output a corrected first image.

20 Claims, 13 Drawing Sheets

Related U.S. Application Data is a continuation-in-part of application No. 17/377,656, filed on Jul. 16, 2021, now abandoned.

(60) Provisional application No. 63/186,346, filed on May 10, 2021, provisional application No. 63/114,079, filed on Nov. 16, 2020.

(51) Int. Cl.

| | |
|---|---|
| G06T 7/11 | (2017.01) |
| G06T 7/30 | (2017.01) |
| G06T 7/90 | (2017.01) |
| G06V 10/141 | (2022.01) |
| G06V 10/24 | (2022.01) |
| G06V 10/56 | (2022.01) |
| G06V 10/82 | (2022.01) |
| H04N 9/73 | (2023.01) |
| H04N 23/85 | (2023.01) |
| H04N 23/90 | (2023.01) |
| H04N 25/17 | (2023.01) |

(52) U.S. Cl.
CPC ............. *G06T 7/90* (2017.01); *G06V 10/141* (2022.01); *G06V 10/24* (2022.01); *G06V 10/56* (2022.01); *G06V 10/82* (2022.01); *H04N 9/73* (2013.01); *H04N 23/90* (2023.01); *G06T 2207/10024* (2013.01); *G06T 2207/20081* (2013.01); *G06T 2207/20084* (2013.01); *G06T 2207/20132* (2013.01); *H04N 25/17* (2023.01)

(58) Field of Classification Search
CPC . G06T 2207/20081; G06T 2207/20084; G06T 2207/20132; G06T 7/33; G06V 10/141; G06V 10/24; G06V 10/56; G06V 10/82; H04N 9/73; H04N 23/90; H04N 25/17; H04N 23/85; H04N 23/88; H04N 23/60
See application file for complete search history.

(56) References Cited

U.S. PATENT DOCUMENTS

| | | |
|---|---|---|
| 9,247,223 B2 | 1/2016 | McCrackin et al. |
| 10,885,389 B2 | 1/2021 | Ichihashi |
| 11,825,209 B2* | 11/2023 | Osadchiy .............. G06N 20/00 |
| 2008/0231726 A1 | 9/2008 | John |
| 2009/0147098 A1 | 6/2009 | Li |
| 2014/0111666 A1 | 4/2014 | Li |
| 2020/0051225 A1 | 2/2020 | Barron et al. |
| 2021/0006760 A1 | 1/2021 | McDonagh et al. |
| 2022/0277485 A1* | 9/2022 | Achar ...................... G06T 7/80 |

FOREIGN PATENT DOCUMENTS

| | | |
|---|---|---|
| CN | 111314683 A | 6/2020 |
| WO | 2020098953 A1 | 5/2020 |

OTHER PUBLICATIONS

Finlayson, G., D., et al., "Chromagenic Colour Constancy", School of Computing Sciences, University of East Anglia, 2015, 4 pages.
Finlayson, G., D., et al., "Colour constancy using the chromagenic constraint" School of Computing Sciences, University of Anglia, 2005, 8 pages.
Barnard, K., et al., "A data set for color research", Computer Division, University of California, Berkley, 2001, http://www.CS.Berkeley.EDU/~kobus/research/publications/data_for_color_research/index.html, 10 pages.
Jiang, J., et al., "What is the Space of Spectral Sensitivity Functions for Digital Color Cameras?", Rochester Institute of Technology, 2013, 12 pages.
Cheng, D., et al., Illuminant Estimation for Color Constancy: Why spatial domain methods work and the role of the color distribution, School of Computing, National University of Singapore, 2014, 10 pages.
Abdelhamed, A., et al., "Leveraging the Availability of Two Cameras for Illuminant Estimation", Samsung AI—Toronto, CVF, 2021, pp. 6637-6646, 10 pages.
Abdelhamed, A., et al., "Supplementary Material Leveraging the Availability of Two Cameras for Illuminant Estimation", Samsung AI Center—Toronto, 2021, 3 pages.
International Search Report issued Feb. 15, 2022 by the International Searching Authority in International Application No. PCT/KR2021/016244.

* cited by examiner

ELECTRONIC DEVICE FOR ESTIMATING CAMERA ILLUMINANT AND METHOD OF THE SAME

CROSS-REFERENCE TO RELATED APPLICATION

This application is a bypass continuation application of International Patent Application No. PCT/KR2021/016244, filed on Nov. 9, 2021, which claims benefit from U.S. Provisional Application No. 63/114,079 filed on Nov. 16, 2020, U.S. Provisional Application No. 63/186,346 filed on May 10, 2021, and U.S. application Ser. No. 17/377,656 filed on Jul. 16, 2021, the disclosures of which are incorporated herein by reference in their entireties.

BACKGROUND

1. Field

The disclosure relates to a system and method for estimating a scene illumination using a neural network configured to predict the scene illumination based on two or more images of the same scene that are simultaneously captured by two or more cameras having different spectral sensitivities, and performing white balance corrections on the captured images.

2. Description of the Related Art

In processing camera captured images, illuminant estimation is a critical step for computational color constancy. Color constancy refers to the ability of the human visual system to perceive scene colors as being the same even when observed under different illuminations. Cameras do not innately possess this illumination adaptation ability, and a raw-RGB image recorded by a camera sensor has significant color cast due to the scene's illumination. As a result, computational color constancy is applied to the camera's raw-RGB sensor image as one of the first steps in the in-camera imaging pipeline to remove this undesirable color cast.

In the related art, color constancy is achieved using (1) a statistics-based method or (2) a learning-based method.

Statistics-based methods operate using statistics from an image's color distribution and spatial layout to estimate the scene illuminant. These statistics-based methods are fast and easy to implement. However, these statistics-based methods make very strong assumptions about scene content and fail in cases where these assumptions do not hold.

Learning-based methods use labelled training data where the ground truth illumination corresponding to each input image is known from physical color charts placed in the scene. In general, learning-based approaches are shown to be more accurate than statistical-based methods. However, learning-based methods in the related art usually include many more parameters than statistics-based ones. The number of parameters could reach up to tens of millions in some models, which result in a relatively longer training time.

SUMMARY

One or more example embodiments provide a system and method for estimating a scene illumination using a neural network configured to predict the scene illumination based on two or more images of the same scene that are simultaneously captured by two or more cameras having different spectral sensitivities. The multiple-camera setup may provide a benefit of improving the accuracy of illuminant estimation.

According to an aspect of an example embodiment, an apparatus for processing image data, may include: a memory storing instructions; and a processor configured to execute the instructions to: obtain a first image and a second image that capture a same scene in different views, from a first camera and a second camera, respectively; spatially align the first image with the second image; obtain a color transformation matrix that maps the first image to the second image based on color values of the first image and the second image; obtain an estimated illuminant color from an output of a neural network by inputting the color transformation matrix to the neural network, wherein the neural network is trained based on a pair of reference images of a same reference scene with a color rendition chart that are captured by different cameras having different spectral sensitivities; and perform a white balance correction on the first image based on the estimated illuminant color to output a corrected first image.

The neural network may be trained to minimize a loss between the estimated illuminant color and a ground-truth illuminant color, and the ground-truth illuminant color may be obtained from a color value of at least one achromatic patch in the color rendition chart.

The second image may show a wider view of the same scene than the first image, and the processor may be further configured to execute the instructions to: crop the second image to have a same view as the first image, to spatially align the first image with the cropped second image.

The processor may be further configured to execute the instructions to: down-sample the first image to obtain a down-sampled first image; down-sample the second image to obtain a down-sampled second image; and compute the color transformation matrix that maps the down-sampled first image to the down-sampled second image based on color values of the down-sampled first image and the down-sampled second image.

The color transformation matrix may be a three-by-three matrix that maps RGB values of the first image to RGB values of the second image.

The output of the neural network may represent a ratio of RGB values of the estimated illuminant color.

The neural network may be further trained using augmented images, and the augmented images may be obtained by re-illuminating a first reference image and a second reference image of different scenes under different illuminations that are captured by a same reference camera, based on color transformations between first color chart values of the first reference image and second color chart values of the second reference image.

The neural network may be further trained using augmented images, and the augmented images may be obtained by re-illuminating a first reference image and a second reference image of different scenes under different illuminations that are captured by a same reference camera, based on color transformations between all color values of the first reference image and all color values of the second reference image.

The color transformation matrix may correspond to a first color transformation matrix. The processor may be further configured to execute the instructions to: obtain, from a third camera, a third image that captures the same scene in a view different from the views of the first image and the second image; spatially align the first image with the third image; spatially align the second image with the third image; obtain a second color transformation matrix that maps the first image to the third image based on the color values of the first image and color values of the third image; obtain a third color transformation matrix that maps the second image to the third image based on the color values of the second image and the color values of the third image; concatenate the first, the second, and the third color transformation matrices to obtain a concatenated matrix; obtain the estimated illuminant color from the output of the neural network by inputting the concatenated matrix to the neural network; and performing the white balance correction on the first image based on the estimated illuminant color to output the corrected first image.

The apparatus may be a user device in which the first camera and the second camera are mounted, and the first camera and the second camera may have different fields of view and different spectral sensitivities.

The apparatus may be a server including a communication interface configured to communicate with a user device including the first camera and the second camera, to receive the first image and the second image from the user device.

According to an aspect of an example embodiment, a method for processing image data may include: obtaining a first image and a second image that capture a same scene in different views, from a first camera and a second camera, respectively; spatially aligning the first image with the second image; obtaining a color transformation matrix that maps the first image to the second image based on color values of the first image and the second image; obtaining an estimated illuminant color from an output of a neural network by inputting the color transformation matrix to the neural network, wherein the neural network is trained based on a pair of reference images of a same reference scene with a color rendition chart that are captured by different cameras having different spectral sensitivities; and performing a white balance correction on the first image based on the estimated illuminant color to output a corrected first image.

The neural network may be trained to minimize a loss between the estimated illuminant color and a ground-truth illuminant color, and wherein the ground-truth illuminant color may be obtained from a color value of at least one achromatic patch in the color rendition chart.

The second image may show a wider view of the same scene than the first image, and the method may further include: cropping the second image to have a same view as the first image, to spatially align the first image with the cropped second image.

The method may further include: down-sampling the first image to obtain a down-sampled first image; down-sampling the second image to obtain a down-sampled second image; and computing the color transformation matrix that maps the down-sampled first image to the down-sampled second image based on color values of the down-sampled first image and the down-sampled second image.

The color transformation matrix may be a three-by-three matrix that maps RGB values of the first image to RGB values of the second image.

The output of the neural network may represent a ratio of RGB values of the estimated illuminant color.

The neural network may be further trained using augmented images, and the augmented images may be obtained by re-illuminating a first reference image and a second reference image of different scenes under different illuminations that are captured by a same reference camera, based on color transformations between first color chart values of the first reference image and second color chart values of the second reference image.

The color transformation matrix may correspond to a first color transformation matrix. The method may further include: obtaining, from a third camera, a third image that captures the same scene in a view different from the views of the first image and the second image; spatially aligning the first image with the third image; spatially aligning the second image with the third image; obtaining a second color transformation matrix that maps the first image to the third image based on the color values of the first image and color values of the third image; obtaining a third color transformation matrix that maps the second image to the third image based on the color values of the second image and the color values of the third image; concatenating the first, the second, and the third color transformation matrices to obtain a concatenated matrix; obtaining the estimated illuminant color from the output of the neural network by inputting the concatenated matrix to the neural network; and performing the white balance correction on the first image based on the estimated illuminant color to output the corrected first image.

According to an aspect of an example embodiment, a non-transitory computer readable storage medium storing a program to be executable by at least one processor to perform a method for processing image data, including: obtaining a first image and a second image that capture a same scene in different views, from a first camera and a second camera, respectively; spatially aligning the first image with the second image; obtaining a color transformation matrix that maps the first image to the second image based on color values of the first image and the second image; obtaining an estimated illuminant color from an output of a neural network by inputting the color transformation matrix to the neural network, wherein the neural network is trained based on a pair of reference images of a same reference scene with a color rendition chart that are captured by different cameras having different spectral sensitivities; and performing a white balance correction on the first image based on the estimated illuminant color to output a corrected first image.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

Figure 1:
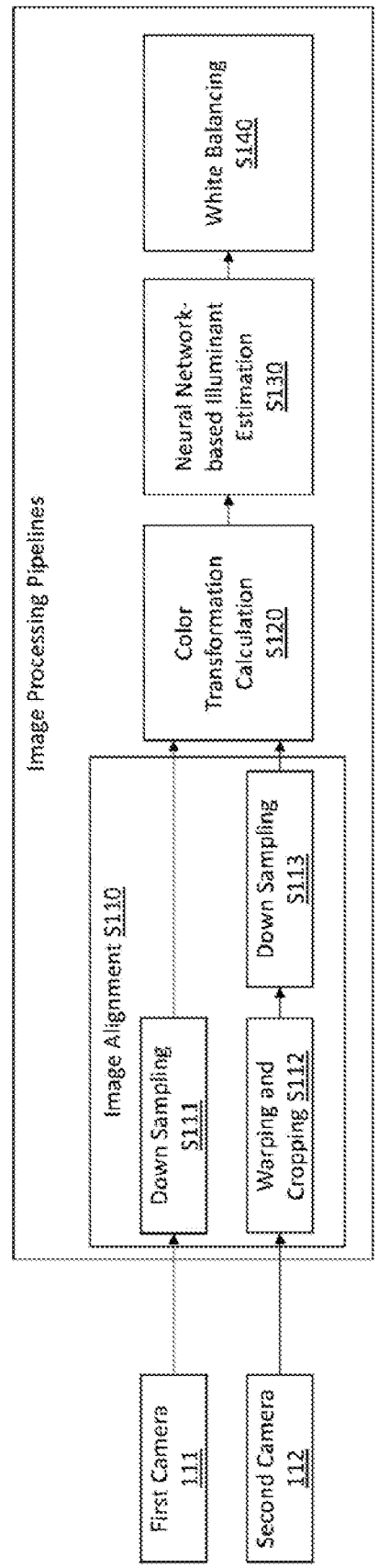
FIG. 1 is a diagram of a system for performing image processing using a pair of cameras according to an embodiment.

Prior to the detailed description of the disclosure, the terms used in the specification may be defined or understood as follows.

Throughout the specification, the terms "first image" or "image 1" may be understood as image from a camera 1 that is an input of image alignment. The first image may be a raw image from the camera 1 or an image modified from the raw image. For an example, the first image may be a raw-RGB image. For another example, the first image may be a converted image by using converting matrix from RYB image to RGB image. The converting matrix may be a RYB to RGB matrix, a RGB to RYB matrix, a CYM to RGB matrix, or etc. According to an embodiment, the converting matrix may include an up-sampling matrix, a down-sampling matrix, a rotation matrix, or the like. Similarly, terms such as "second image" or "image N" may be understood in the same way.

Throughout the specification, the term "raw image" may be understood as image that indicates intensities of light received by a plurality of pixels, the intensities being detected by using a light-receiving sensor after the light passes through color filters corresponding to the pixels, respectively. The raw image data may have a specified pattern based on a pattern of a color filter array consisting of a plurality of types of color filters. In various embodiments of the disclosure, the raw image data having the specified pattern may contain a single color value corresponding to a certain color filter for each of the plurality of pixels. Captured by the light-receiving sensor, the object may refer to individual elements or parts of a scene captured by the light-receiving sensor, or may refer to the entirety of the scene captured by the light-receiving sensor.

Throughout the specification, the term "pixel value" may be understood as a color value corresponding to each pixel, in image (e.g., raw image, RGB image, etc.). The pixel value may include color values with respect to the plurality of colors determined according to the color filter array used. For example, when a Bayer pattern is used for the color filter array, the pixel value may include color values with respect to red, green, and blue colors.

Throughout the specification, the term "RGB image" may be understood as an image in which pixel values include red, green, or blue values.

Throughout the specification, the term "down-sampling" may be understood as reducing the size of an image. According to one embodiment, down-sampling includes finding a single pixel value based on several pixel values.

Throughout the specification, the term "down-sampled image" may be understood as an image that is downscaled by a down-sampling process.

Throughout the specification, the term "cropping" may be understood as selecting a portion of an image corresponding to another image. Throughout the specification, the term "cropped image" may be understood as a portion of an image selected by the cropping process.

Throughout the specification, the term "aligned image" may be understood as an image generated by a cropping and/or down-sampling process.

The following detailed description of example embodiments refers to the accompanying drawings. The same reference numbers in different drawings may identify the same or similar elements.

Example embodiments of the present disclosure are directed to estimating a scene illumination in the RGB color space of camera sensors, and applying a matrix computed from estimated scene illumination parameters to perform a white-balance correction. According to another embodiment, performing white balance may operate in multiple color spaces such as RYB color space, CYM color space, or the like.

FIG. 1 is a diagram of a method for estimating illumination of a physical scene using a neural network according to an embodiment.

As shown in FIG. 1, an image signal processing is performed using a pair of images of the same physical scene that are simultaneously captured by two different cameras, a first camera 111 and a second camera 112. According to embodiments of the present disclosure, both the illuminant for the first camera 111 and the illuminant for the second camera 112 are predicted, but for simplicity, the method shown in FIG. 1 focuses on estimating the illuminant for the first camera 111.

Figure 2:
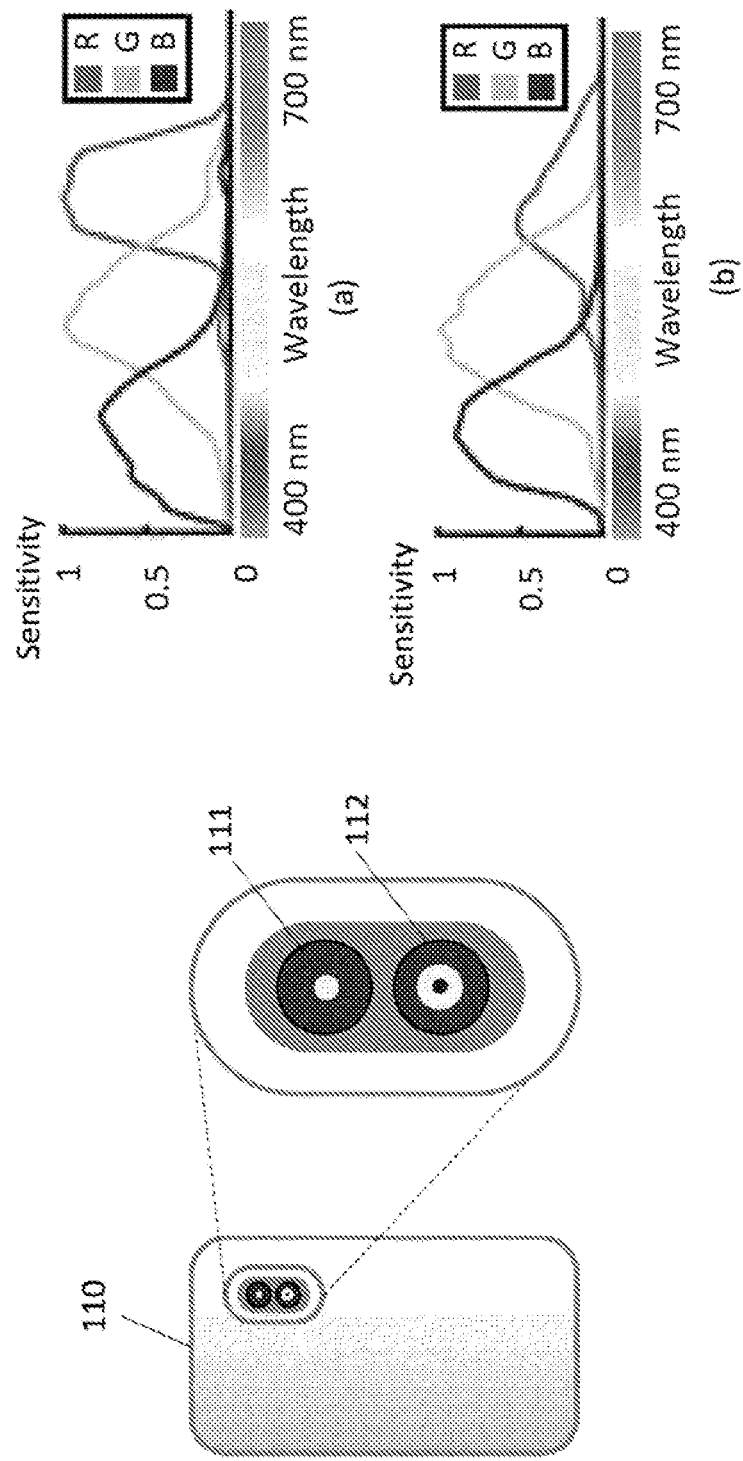
FIG. 2 is a diagram of a user device and spectral sensitivities of a pair of cameras mounted on the user device according to an embodiment.

Referring to FIG. 2, the two cameras 111 and 112 may have different focal lengths and lens configurations to allow a user device (e.g., a smartphone) 110 to deliver DSLR-like optical capabilities of providing a wide-angle view and a telephoto. Also, the two cameras 111 and 112 may have different spectral sensitivities and therefore may provide different spectral measurements of the physical scene.

According to an embodiment of the disclosure, the wavelength range of a component to be converted into an electrical image signal with respect to each pixel may be based on the specified pattern of the color filter array, and accordingly, the raw image data having a plurality of pixels may be in a form of the specified pattern. According to various embodiments of the disclosure, the specified pattern may be any one of a Bayer pattern, a red-green-blue-emerald (RGBE) pattern, a red-yellow-yellow-blue (RYYB) pattern, a cyan-yellow-yellow-magenta (CYYM) pattern, a cyan-yellow-green-magenta (CYGM) pattern, a red-green-blue-white (RGBW) Bayer pattern, and an X-Trans pattern, and may have a pattern that is not listed above, i.e., the raw image may be a raw RGB image, a raw RYB image, a raw CYM image, or the like.

Graphs (a) and (b) shown in FIG. 2 represent the spectral sensitivities of the first camera 111 and the second camera 112 in RGB channels, respectively.

For example, the pitch of photodiodes and the overall resolutions of the two image sensors (e.g., charge-coupled device (CCD) sensors) mounted in the first camera 111 and the second camera 112 may be different from each other to accommodate the different optics associated with each sensor. Also, different color filter arrays (CFA) may be used in the first camera 111 and the second camera 112 according to the different optics, which may result in the different spectral sensitivities to incoming light as shown in graphs (a) and (b) of FIG. 2.

According to an embodiment, the first camera 111 and the second camera 112 may simultaneously capture a first raw image and a second raw image of the same scene, respectively, that provide different spectral measurements of the scene.

The first raw image and the second raw image may have different views while capturing the same scene. The image signal processing according to an embodiment of the present disclosure may use the color values of the scene captured with the different spectral sensitivities to estimate the scene illumination since the color values are correlated with the scene illumination.

According to an embodiment, a first/second image, which is an input image of Image Alignment S110 shown in FIG. 1, may be the first/second raw image when the first raw image and the second raw image are in the same color space. According to another embodiment, the first/second image may be obtained by using converting matrix, when the first raw image and the second raw image are not in the same color space. For example, the first raw image may be a RGB Bayer image and the second raw image may be a RYYB image. A second RGB image may be obtained by using a pre-determined converting matrix (e.g., RGB=[matrix]*RYB) to the second raw image. According to another embodiment, the first/second image may be obtained by using converting matrix when the first raw image and the second raw image are in the same color space. For example, the first raw image and the second raw image may be the RYB Bayer images. The first/second image may be obtained by using a pre-determined converting matrix (e.g., RGB=[matrix]*RYB) to the first/second raw image.

Referring back to FIG. 1, the image signal processing may include: image alignment operation S110 for spatially aligning a pair of images, color transformation operation S120 for computing color transformation between the images, illumination estimation operation S130 for estimate the scene illumination using a neural network, and white balance operation S140 for correcting scene colors in the images based on the estimated scene illumination.

In image alignment operation S110, a global homography may be used to align two different images of the same scene having different fields of view, and then down-sampling is performed on the aligned two images, prior to computing color transformation between the two images.

Specifically, down-sampling S111 and S113 and warping and cropping S112 are performed to register the pair of the first image and the second image, which capture the same scene but have different fields of view.

In a first processing pipeline, the first image is downscaled by a preset factor (e.g., a factor of six) in operation S111.

In a second processing pipeline, either or both of image warping and image cropping S112 are performed on the second image to align the second image with the first image. For example, in the second processing pipeline, the second image is cropped to have the same size of the field of view as the first image. Additionally, any one or any combination of transformation, rotation, and translation may be applied to the second image so that the same objects in the first image and the second image are located at the same pixel coordinates.

Figure 3A:
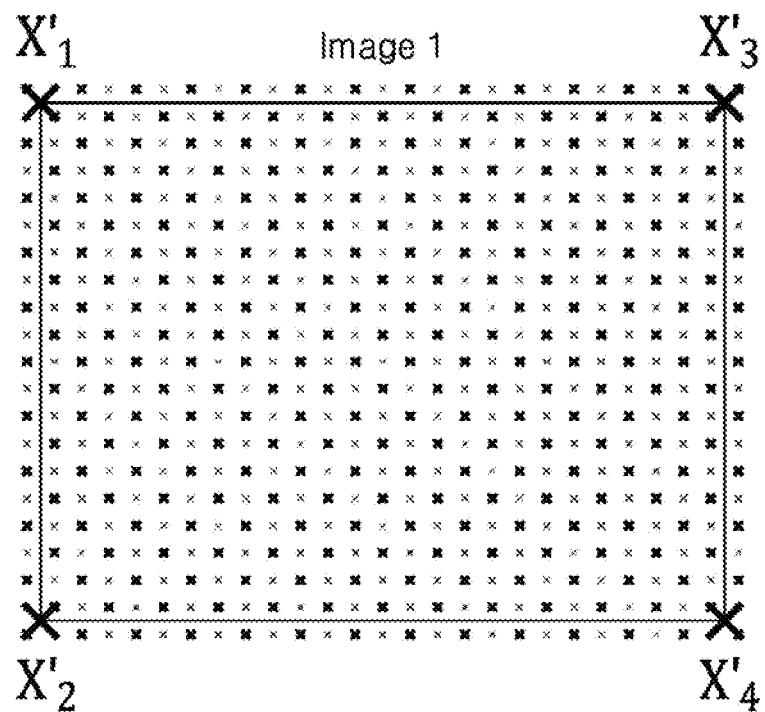
FIGS. 3A and 3B illustrate a wrap and crop operation according to an embodiment.
Figure 3B:
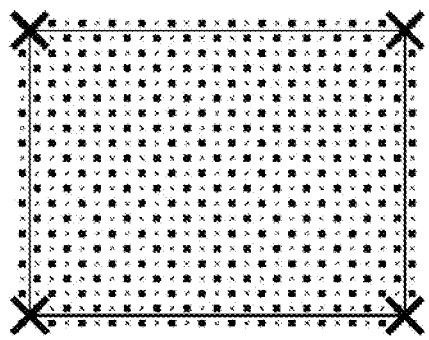

FIGS. 3A-3B illustrate a wrap and crop operation according to an embodiment of the disclosure. A pre-calibrated perspective transform H is calculated between the first and second cameras 111 and 112, and the perspective transform H is applied to the second image to align the second mage with the first image.

As shown in FIGS. 3A-3B, the first camera 1 and the second camera 2 may capture a preset pattern to obtain image 1 and image 2, respectively.

At least four points $x_1'$, $x_2'$, $x_3'$, and, $x_4'$ are selected from image 1 to compute the perspective transform H.

$x_1' = (x_1', y_1', 1)^T$
$x_2' = (x_2', y_2', 1)^T$
$x_3' = (x_3', y_3', 1)^T$
$x_4' = (x_4', y_4', 1)^T$

The corresponding points $x_1$, $x_2$, $x_3$, and $x_4$ in image 2 are represented as follows:

$x_1 = (x_1, y_1, 1)^T$
$x_2 = (x_2, y_2, 1)^T$
$x_3 = (x_3, y_3, 1)^T$
$x_4 = (x_4, y_4, 1)^T$

Matrix h $[h_1, h_2, h_3, h_4, h_5, h_6, h_7, h_8, h_9]$ is obtained based on the following:

$$\begin{bmatrix} 0^T & -x_1^T & y_1'x_1^T \\ x_1^T & 0^T & -x_1'x_1^T \\ 0^T & -x_2^T & y_2'x_2^T \\ x_2^T & 0^T & -x_2'x_2^T \\ \cdots & \cdots & \cdots \\ 0^T & -x_4^T & y_4'x_4^T \\ x_4^T & 0^T & -x_4'x_4^T \end{bmatrix}_{8\times 9} \times \begin{bmatrix} h_1 \\ h_2 \\ h_3 \\ h_4 \\ h_5 \\ h_6 \\ h_7 \\ h_8 \\ h_9 \end{bmatrix}_{9\times 1} = 0_{8\times 1}$$

Using matrix h $[h_1, h_2, h_3, h_4, h_5, h_6, h_7, h_8, h_9]$, the perspective transform H is obtained as follows:

$$H = \begin{bmatrix} h_1 & h_2 & h_3 \\ h_4 & h_5 & h_6 \\ h_7 & h_8 & h_9 \end{bmatrix}_{3\times 3}$$

Once the perspective transform H is computed using the calibration pattern, the warp and crop operation for a new scene is performed by applying the perspective transform H to an image captured by the second camera 112 (e.g., the second image). In an example embodiment, the warp and crop operation may be performed only once for the two cameras 111 and 112, rather than being performed individually for new images captured by the cameras 111 and 112.

Once the second mage is aligned with the first mage, down-sampling S113 is performed on the aligned second image.

The down-sampling S111 and the down-sampling S113 may use the same down-sampling factor to allow the down-sampled first image and the down-sampled first image to have substantially the same resolution. However, the present embodiment is not limited thereto, and different down-sampling factors may be used for the down-sampling S111 and the down-sampling S113. Also, the first processing pipeline including operation S111 and the second processing pipeline including operations S112 and S113 may be executed in parallel or in sequence.

The down-sampling S111 and the down-sampling S113 prior to computing the color transformation, may make the illumination estimation robust to any small misalignments and slight parallax in the two views. Since the hardware arrangement of the two cameras 111 and 112 does not change for a given device (e.g., the user device 110), the homography can be pre-computed and remains fixed for all image pairs from the same device.

In color transformation operation S120, a color transformation matrix is computed to map the down-sampled first image from the first camera 111 to the corresponding aligned and down-sampled second image from the second camera 112. For a particular scene illuminant, the color transformation between the two different images of the same scene may have a unique signature that is related to the scene illumination. Accordingly, the color transformation itself may be used as the feature for illumination estimation.

Given the first image $I_1 \in R^{n \times 3}$ and the second image $I_2 \in R^{n \times 3}$ with n pixels of the same scene captured by the first camera 111 and the second camera 112, under the same illumination $L \in R^3$, there exists a linear color transformation $T \in R^{3 \times 3}$ between the color values of the first images $I_1$ and the second image $I_2$ as:

$$I_2 \approx I_1 T \quad \text{Equation (1)}$$

such that T is unique to the scene illumination L.

T is computed using the pseudo inverse, as follows:

$$T = (I_1^T I_1)^{-1} I_1^T I_2 \quad \text{Equation (2)}$$

For example, the linear color transformation T may be represented in a 3×3 color transformation matrix as follows:

$$T_{3 \times 3} = \begin{pmatrix} t_1 & t_2 & t_3 \\ t_4 & t_5 & t_6 \\ t_7 & t_8 & t_9 \end{pmatrix}$$

More specifically, given A denotes pixel values in R, G, B color channels for the down-sampled first image, B denotes pixel values in R, G, B color channels for the aligned and down-sampled second image, the 3×3 color transformation matrix T between A and B is calculated as follows.

$$A \times T = B$$

$$A = \begin{bmatrix} a_{1R} & a_{1G} & a_{1B} \\ a_{2R} & a_{2G} & a_{2B} \\ \cdots & \cdots & \cdots \\ a_{NR} & a_{NG} & a_{NB} \end{bmatrix}$$

$$T = \begin{bmatrix} t_{11} & t_{12} & t_{13} \\ t_{21} & t_{22} & t_{23} \\ t_{31} & t_{32} & t_{33} \end{bmatrix}$$

$$B = \begin{bmatrix} b_{1R} & b_{1G} & b_{1B} \\ b_{2R} & b_{2G} & b_{2B} \\ \cdots & \cdots & \cdots \\ b_{NR} & b_{NG} & b_{NB} \end{bmatrix}$$

In the matrices of A and B, the three columns correspond to R, G, B color channels, and the rows correspond to the number of pixels in the down-sampled first image and the aligned and down-sampled second image, respectively.

Using a pseudo-inverse equation, the 3×3 color transformation matrix T is calculated as follows:

$$T = \left( \begin{bmatrix} a_{1R} & a_{1G} & a_{1B} \\ a_{2R} & a_{2G} & a_{2B} \\ \cdots & \cdots & \cdots \\ a_{NR} & a_{NG} & a_{NB} \end{bmatrix}^T \begin{bmatrix} a_{1R} & a_{1G} & a_{1B} \\ a_{2R} & a_{2G} & a_{2B} \\ \cdots & \cdots & \cdots \\ a_{NR} & a_{NG} & a_{NB} \end{bmatrix} \right)^{-1} \begin{bmatrix} a_{1R} & a_{1G} & a_{1B} \\ a_{2R} & a_{2G} & a_{2B} \\ \cdots & \cdots & \cdots \\ a_{NR} & a_{NG} & a_{NB} \end{bmatrix}^T$$

-continued $$\begin{bmatrix} b_{1R} & b_{1G} & b_{1B} \\ b_{2R} & b_{2G} & b_{2B} \\ \cdots & \cdots & \cdots \\ b_{NR} & b_{NG} & b_{NB} \end{bmatrix}$$

In the embodiment, the 3×3 color transformation matrix is used since the 3×3 color transformation matrix is linear and accurate, and computationally efficient. However, the size of the color transformation matrix is not limited thereto, and any 3×M color transformation matrix (wherein M=3) may be used.

In illumination estimation operation S130, a neural network trained for estimating the illumination of the scene (e.g., the illuminant color) receives, as input, the color transformation, and outputs a two-dimensional (2D) chromaticity value that corresponds to the illumination estimation of the scene. The 2D chromaticity value may be represented by a ratio of R, G, and B values, such as 2D [R/G B/G]. For example, the estimated illumination $\hat{L}$ is expressed as:

$$\hat{L} = \begin{pmatrix} \hat{r} \\ \hat{b} \end{pmatrix} = \begin{pmatrix} \hat{r} \\ 1 \\ \hat{b} \end{pmatrix}$$

Figure 4:
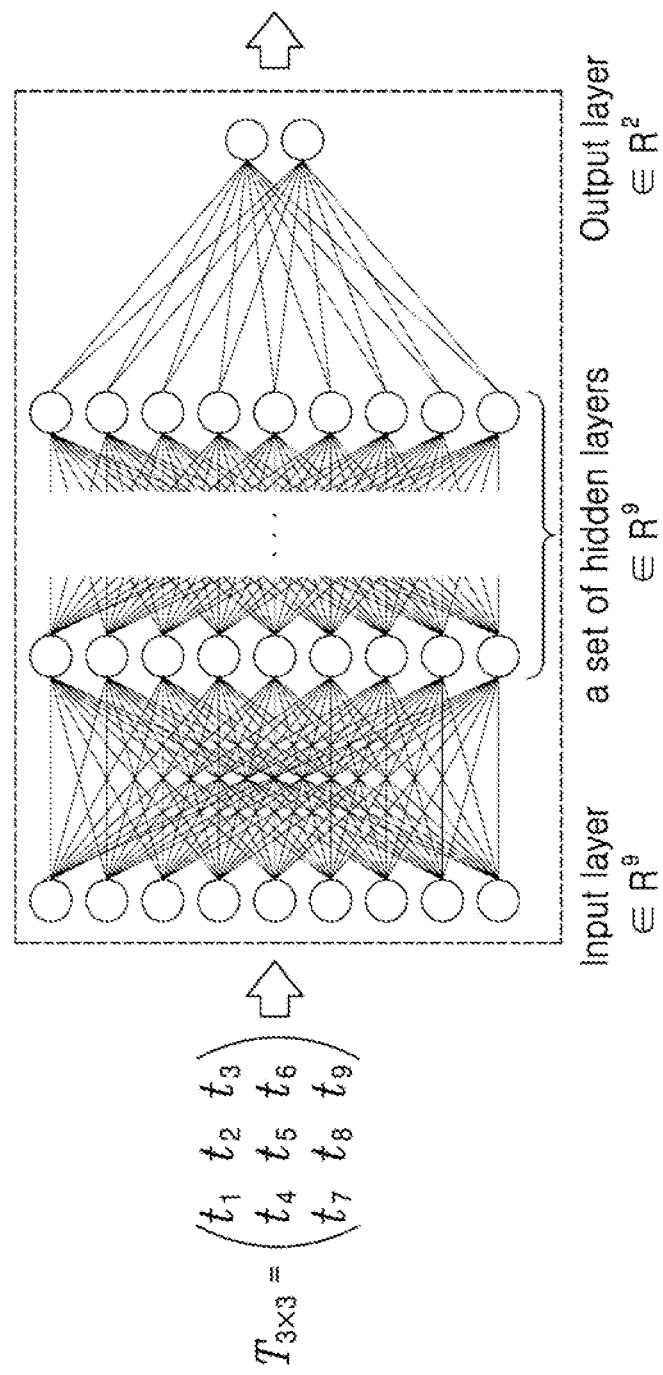
FIG. 4 is a diagram of a neural network for estimating illumination of a scene captured by a pair of cameras according to an embodiment.

Referring to FIG. 4, the neural network may include an input layer having nine (9) nodes for receiving the nine (9) parameters of the 3×3 color transformation matrix, an output layer having two nodes for outputting the 2D chromaticity value, a set of hidden layers placed between the input layer and the output layer. For example, each hidden layer may include nine (9) nodes.

The neural network according to an example embodiment may be required to process only the nine parameters in the color transformation matrix, and as a result, the neural network is relatively very light compared with other image processing networks, and therefore is capable of being efficiently run on-device in real time.

A method and a system for training the neural network will be described later with reference to FIG. 7.

Referring back to FIG. 1, in white balance operation S140, a white balance gain of the first image is adjusted based on the estimated illumination of the light source at the scene.

Parameters such as the R gain and the B gain (i.e., the gain values for the red color channel and the blue color channel) for white balance adjustment are calculated based upon a preset algorithm.

In an embodiment, white balance correction factors (e.g., $\alpha$, $\beta$, $\gamma$) are selected for the first image based on the estimated illumination, and each color component (e.g., $R_{WB}$, $G_{WB}$, $B_{WB}$) of the first image is multiplied with its respective correction factor (e.g., $\alpha$, $\beta$, $\gamma$) to obtain white-balanced color components (e.g., $\alpha R_{WB}$, $\beta G_{WB}$, $\gamma B_{WB}$).

In an embodiment, a R/G correction factor and a B/G correction factor may be computed based on the estimated illumination, to adjust the R/G gain and B/G gain of the first image.

Figure 5:
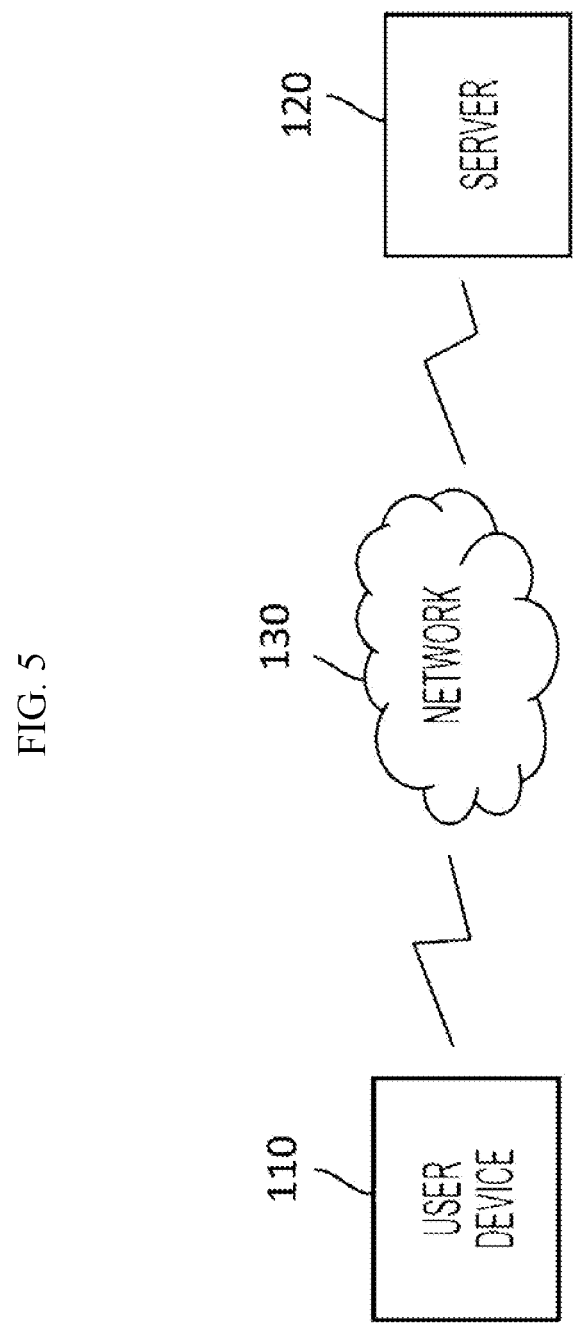
FIG. 5 is a diagram of devices of the system for performing the image processing according to an embodiment.

FIG. 5 is a diagram of devices for performing the illumination estimation according to an embodiment. FIG. 5 includes a user device 110, a server 120, and a network 130. The user device 110 and the server 120 may interconnect via wired connections, wireless connections, or a combination of wired and wireless connections.

The user device 110 includes one or more devices configured to generate an output image. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a camera device, a wearable device (e.g., a pair of smart glasses or a smart watch), or a similar device.

The server 120 includes one or more devices configured to train a neural network for predicting the scene illumination using camera images to correct scene colors in the camera images. For example, the server 120 may be a server, a computing device, or the like. The server 120 may receive camera images from an external device (e.g., the user device 110 or another external device), train a neural network for predicting illumination parameters using the camera images, and provide the trained neural network to the user device 110 to permit the user device 110 to generate an output image using the neural network.

The network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) may perform one or more functions described as being performed by another set of devices.

Figure 6:
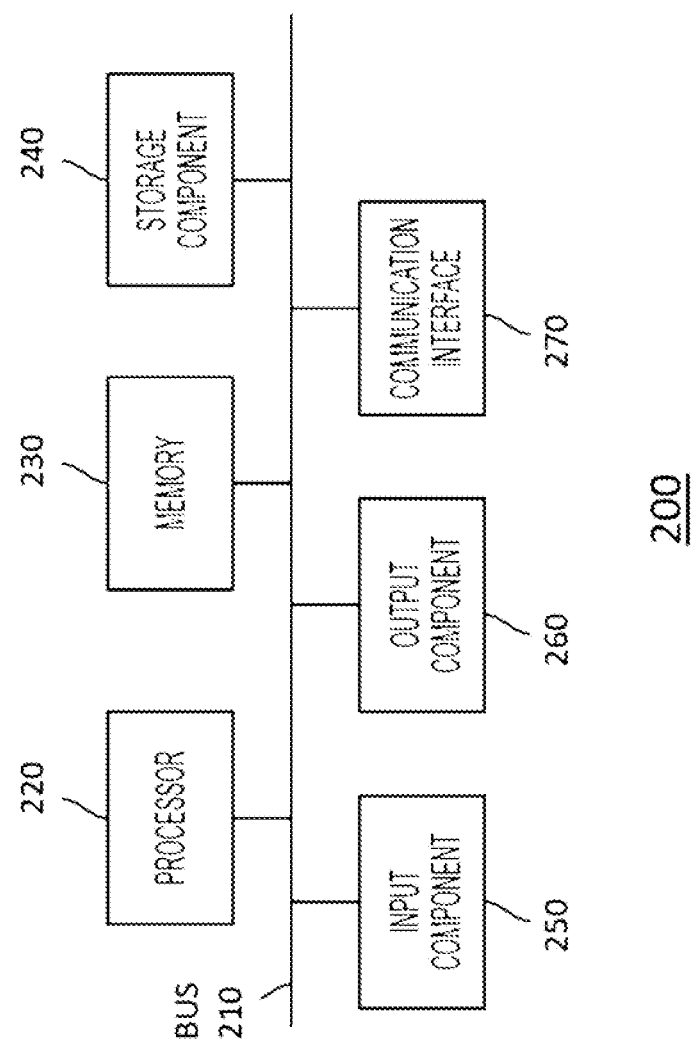
FIG. 6 is a diagram of components of the devices of FIG. 5 according to an embodiment.

FIG. 6 is a diagram of components of one or more devices of FIG. 5 according to an embodiment. Device 200 may correspond to the user device 110 and/or the server 120.

As shown in FIG. 6, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 may include a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The process 220 may include one or more processors capable of being programmed to perform a function.

The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). The input component 250 may include a sensor for sensing information (e.g., a global positioning system (GPS) component, an accelerometer, a gyroscope, and/or an actuator).

In particular, the input component 250 may include two or more cameras, including the first camera 111 and the second camera 112 illustrated in FIG. 2. The first camera 111 and the second camera 112 may be rear-facing cameras that have different spectral sensitivities and have different fields of view from each other. Images captured by the cameras included the input component 250 may be transferred to the processor 220 through the bus 210.

The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations S110-S140 based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

Figure 7:
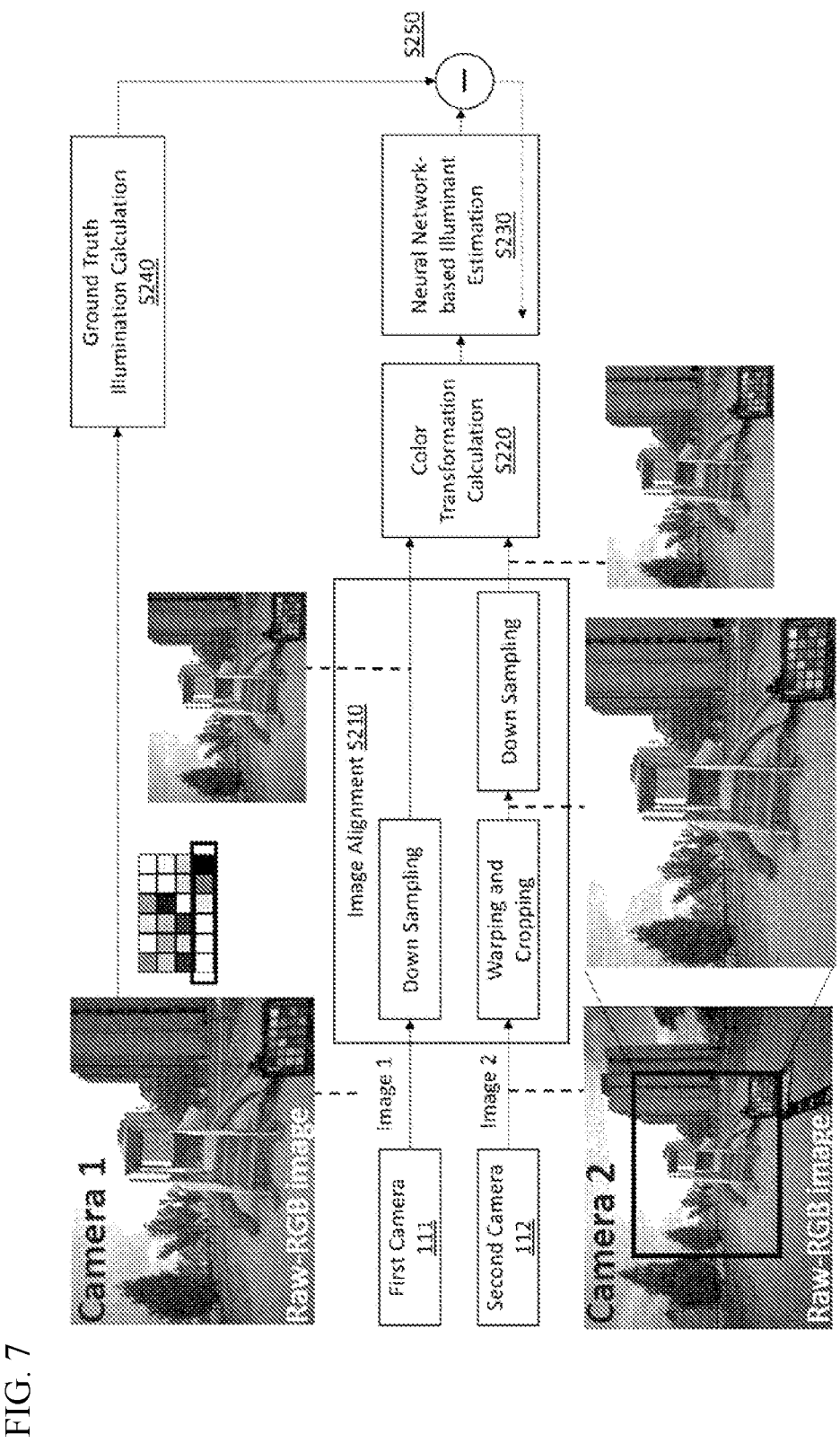
FIG. 7 is a diagram of a system for training a neural network of FIG. 5 according to an embodiment.

FIG. 7 is a diagram of a system for training a neural network of FIG. 4 according to an embodiment. The training process may be performed by the user device 110 or the server 120, using the components illustrated in FIG. 6.

The neural network according to an embodiment is trained to predict the illuminant for the first camera 111 and the illuminant for the second camera 112 using the same color transforms, but for simplicity, the description of the training process in the present disclosure focuses on estimating the illuminant for the first camera 111.

As shown in FIG. 7, a network training process is performed using a pair of images of the same physical scene that are simultaneously captured by two different cameras 111 and 112. The two cameras 111 and 112 may have different spectral sensitivities and therefore may provide different spectral measurements for the same scene having the same light source.

The first camera 111 and the second camera 112 may simultaneously capture a first raw image and a second raw image of the same scene, respectively, that provide different spectral measurements of the scene. The first raw image and the second raw image may have different views while capturing the same scene.

According to an embodiment, a first/second image, which is an input image of Image Alignment S210, may be the first/second raw image when the first raw image and the second raw image are in the same color space. According to another embodiment, the first/second image may be obtained by using converting matrix, when the first raw image and the second raw image are not in the same color space. For example, the first raw image may be a RGB Bayer image and the second raw image may be a RYYB image. A second RGB image may be obtained by using a pre-determined converting matrix (e.g., RGB=[matrix]*RYB) to the second raw image. According to another embodiment, the first/second image may be obtained by using converting matrix when the first raw image and the second raw image are in the same color space. For example, the first raw image and the second raw image may be the RYB Bayer images. The first/second image may be obtained by using a pre-determined converting matrix (e.g., RGB=[matrix]*RYB) to the first/second raw image.

For the purposes of training the neural network, the first camera 111 and the second camera 112 may capture a color rendition chart as shown in FIG. 7. The color rendition chart may allow the first image and the second image to provide a wide distribution of colors under the scene. Also, the neutral patches (also referred to as "achromatic patches" or "gray patches") of the color rendition chart in the first image may provide a ground truth illumination value (e.g., a ground-truth illuminant color) for the first image. Likewise, the neutral patches in the second image may provide a ground truth illumination value for the second image.

Hereinafter, the first image and the second image may be referred to as image 1 and image 2.

In operation S210, image 1 and image 2 are spatially aligned with each other, for example, using a global homography. For example, image 2 is cropped to have the same size of the field of view as image 2, and any one or any combination of transformation, rotation, and translation is applied to image 2 so that the same objects (e.g., the slide) in image 1 and image 2 are located at the same pixel coordinates.

In turn, the image 1 and the aligned image 2 are down-sampled prior to computing color transformation between image 1 and image 2. The down-sampling may make the illumination estimation robust to any small misalignments and slight parallax in the two views of images 1 and 2. Since the hardware arrangement of the two cameras 111 and 112 does not change for a given device, the homography can be pre-computed and remains fixed for all image pairs from the same device.

In operation S220, a color transformation matrix is computed to map the down-sampled image 1 from the first camera 111 to the corresponding aligned and down-sampled image from the second camera 112. For example, the color transformation matrix may be computed based on Equations (1) and (2).

In operation S230, a neural network for estimating the illumination of the scene is constructed to have the structure shown in FIG. 4. For example, the neural network may include an input layer having nine (9) nodes for receiving the nine (9) parameters of a 3×3 color transformation matrix, an output layer having two nodes for outputting the 2D chromaticity value, a set of hidden layers placed between the input layer and the output layer. The neural network according to an example embodiment may be required to process only the nine parameters in the color transformation matrix, and as a result, the neural network is relatively very light compared with other image processing networks, and therefore is capable of being efficiently run on-device in real time.

In the training process, the neural network receives, as input, the parameters of the color transformation matrix, and outputs a two-dimensional (2D) chromaticity value that corresponds to the illumination estimation of the scene. The 2D chromaticity value may be represented as 2D [R/G B/G], indicating a ratio of a red color value to a green color value, and a ratio of a blue color value to the green color value.

Given a dataset of M image pairs $L=\{(I_{11}, I_{21}), \ldots, (I_{1M}, I_{2M})\}$, the corresponding color transformations $T_1, \ldots, T_M$ between each pair of images are computed using Equation (2), as follows:

$$T=\{T_1, \ldots, T_M\}$$

$(I_{11}, I_{21})$ may denote image 1 and image 2, and $T_1$ may denote color transformation between image 1 and image 2. The training process according to the embodiment is described using the pair of images 1 and 2, but a large number of paired images may be used for training the neural network. Augmented training images may be developed by applying mathematical transformation functions to camera captured images. The description of data augmentation will be provided later with reference to FIGS. 7-9.

In operation S240, a set of corresponding target ground truth illuminations L of image (i.e., as measured by the first camera 111) is obtained from each pair of images as follows:

$$L=\{L_1, \ldots, L_M\},$$

$L_1$ may denote a ground truth illumination of image 1. The ground truth illumination $L_1$ may be obtained by extracting the image area of the neutral patches from image 1 and measuring pixel colors of the neutral patches since the neutral patches work as a good reflector of the scene illumination. For example, average pixel colors $L_1$ [$R_{avg}$, $G_{avg}$, $B_{avg}$] inside the neutral patches may be used as the ground truth illumination $L_1$ for image 1.

The neural network $f_\theta:T\rightarrow L$ is trained with parameters $\theta$ to model the mapping between the color transformations T and scene illuminations L. The neural network $f_\theta$ may predict the scene illumination $\hat{L}$ for the first camera 111 given the color transformation T between image 1 and image 2, as follows:

$$\hat{L}=f_\theta(T) \qquad \text{Equation (3)}$$

In operation S250, the neural network $f_\theta$ is trained to minimize the loss between the predicted illuminations $\hat{L}_i$ and the ground truth illuminations $L_1$ as follows:

$$\min_{\theta} \frac{1}{M} \sum_{i=1}^{M} |\hat{L}_i - L_i| \qquad \text{Equation (4)}$$

The neural network according to an embodiment is lightweight, for example, consisting of a small number (e.g., 2, 5, or 16) of dense layers, wherein each layer has nine neurons only. The total number of parameters may range from 200 parameters for the 2-layer neural network up to 1460 parameters for the 16-layer neural network. The input to the neural network is the flattened nine values of the color transformation T and the output is two values corresponding to the illumination estimation in the 2D [R/G B/G] chromaticity color space where the green channel's value may be set to 1.

According to embodiments of the present disclosure, the user device 110 or the server 120 may use the neural network that has been trained by an external device without performing an additional training process on the user device 110 or the server 120, or alternatively may continue to train the neural network in real time on the user device 110 or the server 120.

Figure 8:
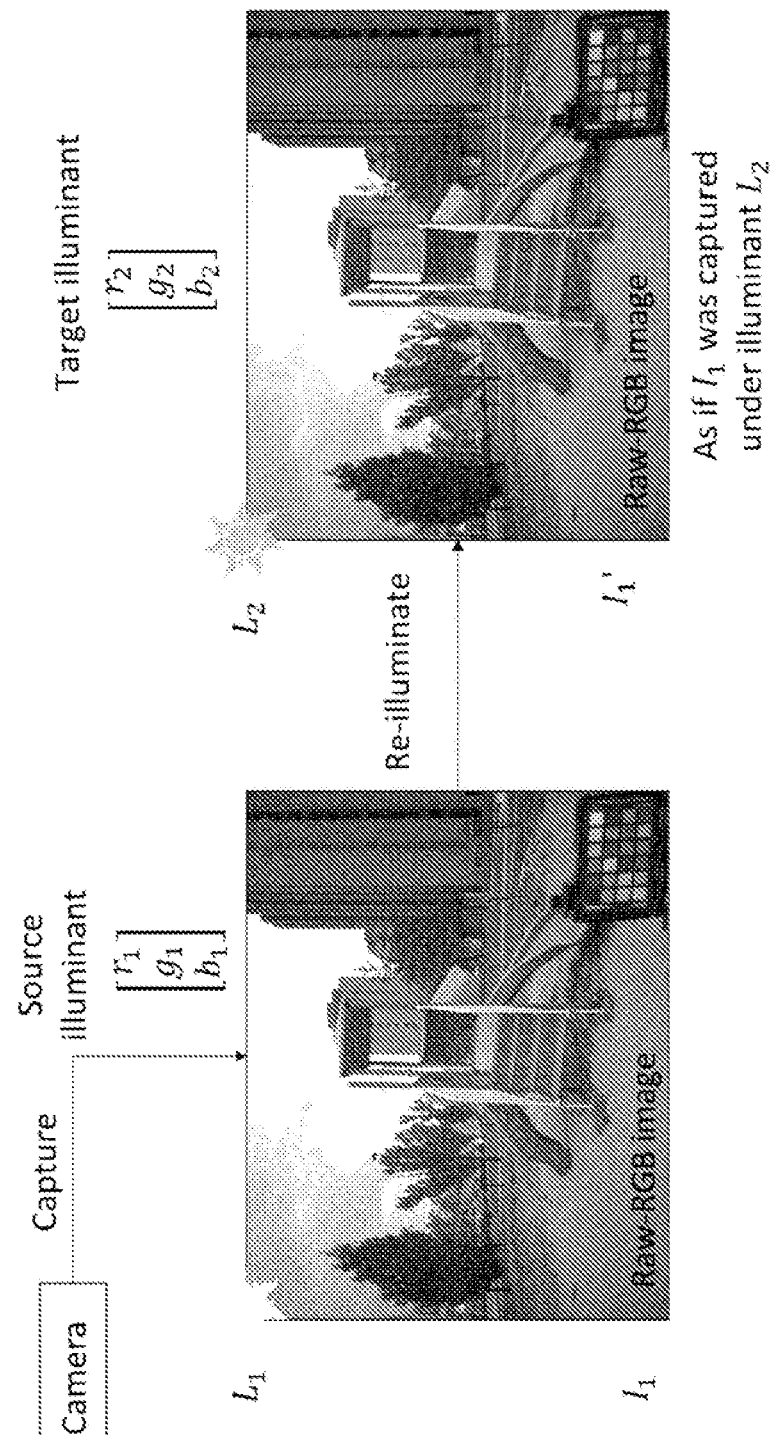
FIG. 8 illustrates a data augmentation process according to an embodiment.

FIG. 8 illustrates a data augmentation process according to an embodiment.

Due to the difficulty in obtaining large datasets of image pairs captured with two cameras under the same illumination, a data augmentation process may be performed to increase the number of training samples and the generalizability of the model according to an example embodiment.

As shown in FIG. 8, image $I_1$ is captured under a source illuminant $L_1$ [$r_1$, $g_1$, $b_1$] and includes a color rendition chart. Image $I_1$ is re-illuminated to obtain image $I_1'$ which appears to be captured under the target illuminant $L_2$[$r_2$, $g_2$, $b_2$]. Image $I_1'$ as well as image $I_1$ may be used to train the neural network.

Various methods may be used to re-illuminate an image which will be described with references to FIG. 9-11 hereinafter.

Figure 9:
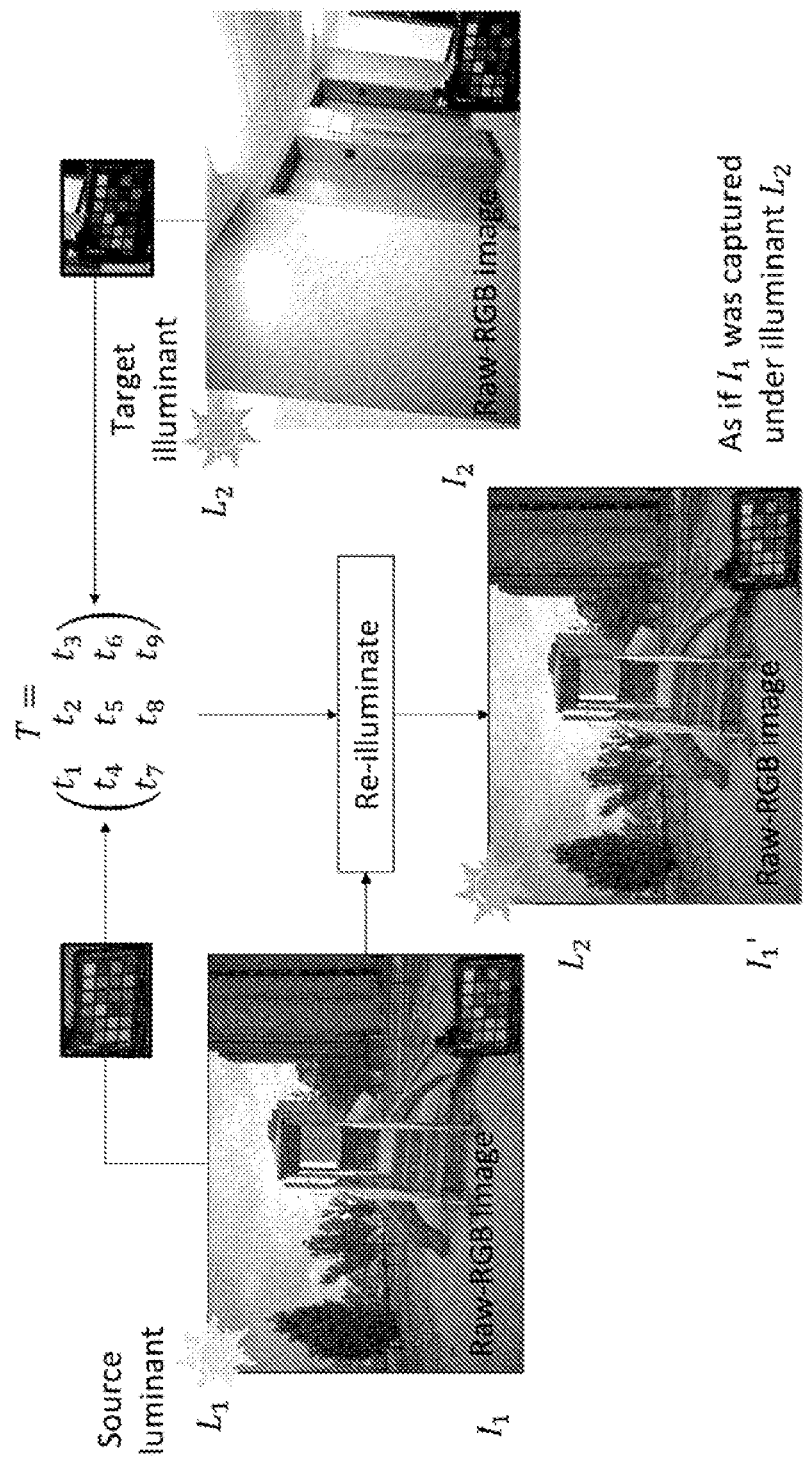
FIG. 9 illustrates a data augmentation process based on full matrix transformation between color rendition charts captured in images according to an embodiment.

FIG. 9 illustrates a data augmentation process based on a full matrix transformation between color rendition charts captured in images according to an embodiment.

As shown in FIG. 9, a pair of captured images $I_1$ and $I_2$ are used to obtain a re-illuminated mage $I_1'$ that includes the same image content as the captured image $I_1$ but has different color values from the captured image $I_1$. The captured image $I_1$ and captured image $I_2$ are images captured by the same camera (e.g., the first camera 111), under different light sources, illuminant $L_1$ and illuminant $L_2$, respectively. The captured image $I_1$ and captured image $I_2$ both include a color rendition chart captured therein.

In order to re-illuminate the captured image $I_1$ based on the color values of the captured image $I_2$, the color rendition chart is extracted from each of the captured image $I_1$ and the captured image $I_2$. A color transformation matrix T is computed based on the color chart values of the captured image $I_1$ and the color chart values of the captured image $I_2$. The color transformation matrix T may convert the color chart values of the captured image $I_1$ to the color chart values of the captured image $I_2$.

The color transformation matrix T is applied to the captured image $I_1$ to transform approximately all the colors in the captured image $I_1$ and thereby to obtain the re-illuminated mage $I_1'$ which appears to be captured under illuminant $L_2$.

While FIG. 9 shows augmentation of an image pair from the first camera 111 only, the corresponding pair of images from the second camera 112 is augmented in the same way. Also, the captured image $I_2$ (as well as the captured image $I_1$) is re-illuminated in a similar manner, based on a color transformation matrix that transforms the color chart values of the captured image $I_2$ to the color chart values of the captured image $I_1$.

In an example embodiment of the present disclosure, given a small dataset of image pairs captured with two cameras and including the color rendition charts, the color values of the color chart patches (e.g., the 24 color chart patches shown in FIG. 9), $C \in R^{24 \times 3}$, are extracted from each image.

A color transformation $T_C^{1i \to 1j} \in R^{3 \times 3}$ between each pair of images ($I_{1i}$, $I_{1j}$) is obtained from the first camera 111 based only on the color chart values from the two images ($I_{1i}$, $I_{1j}$) as follows:

$$T_C^{1i \to 1j} = I_{1i}^T I_{1i})^{-1} I_{1i}^T I_{1j}$$

Similarly, the color transformation $T_C^{2i \to 2j}$ for image pairs ($I_{2i}$, $I_{2j}$) is obtained from the second camera 112 as follows:

$$T_C^{2i \to 2j} = I_{2i}^T I_{2i})^{-1} I_{2i}^T I_{2j}$$

This bank of color transformations is applied to augment images by re-illuminating any given pair of images from the two cameras ($I_{1i}$, $I_{2i}$) to match their colors to any target pair of images $I_{1j}$, $I_{2j}$, as follows:

$$I_{1i \to j} = I_{1i} T_C^{1i \to 1j}$$

$$I_{2i \to j} = I_{2i} T_C^{2i \to 2j}$$

where i→j means re-illuminating image i to match the colors of image j. Using this illuminant augmentation method, the number of training image pairs may be increased from M to $M^2$.

According to the data augmentation process shown in FIG. 9, approximately all colors may be transformed since the color rendition charts included in the images provide a wide distribution of colors.

Figure 10:
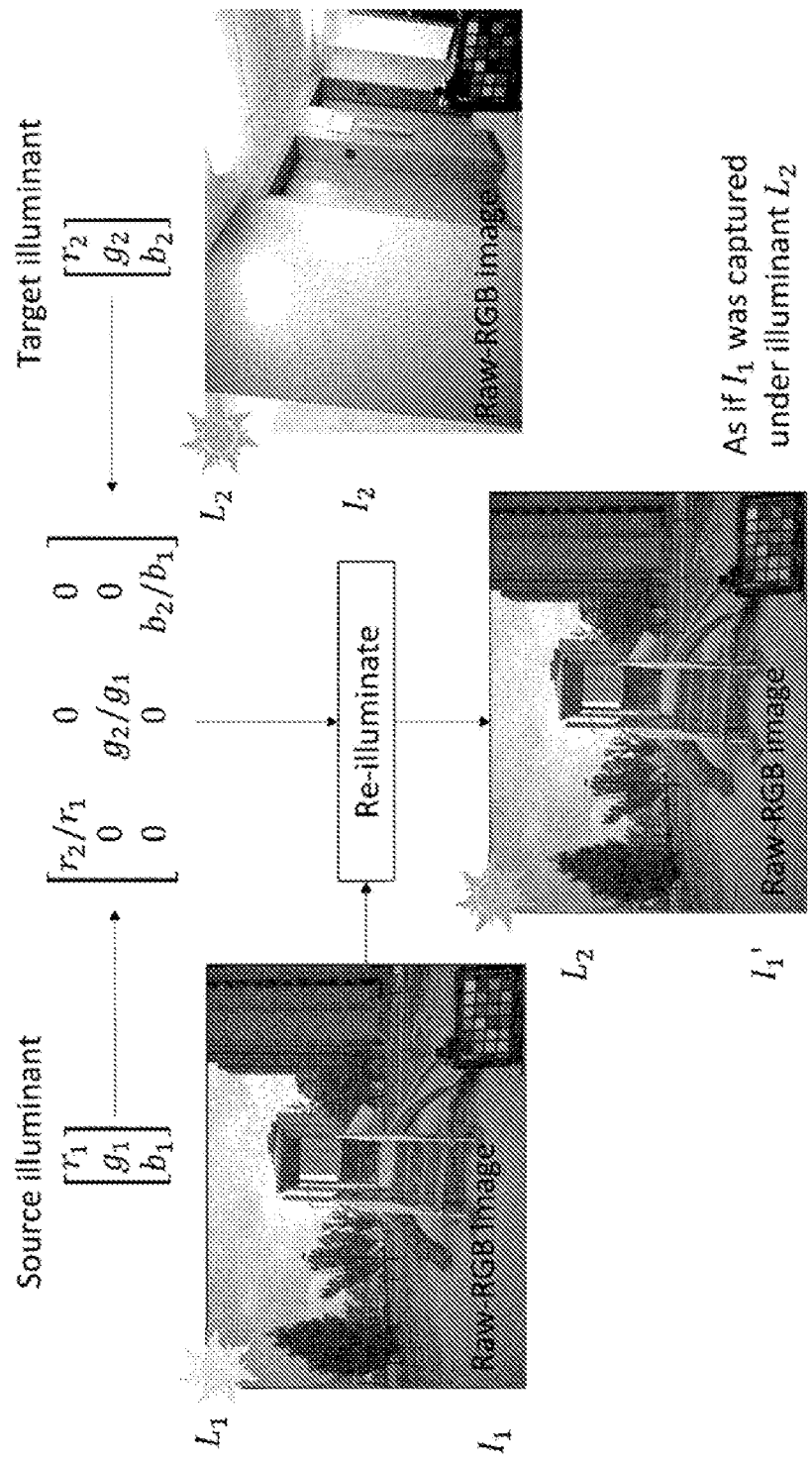
FIG. 10 illustrates a data augmentation process based on diagonal transformation between illuminants according to an embodiment.
Figure 11:
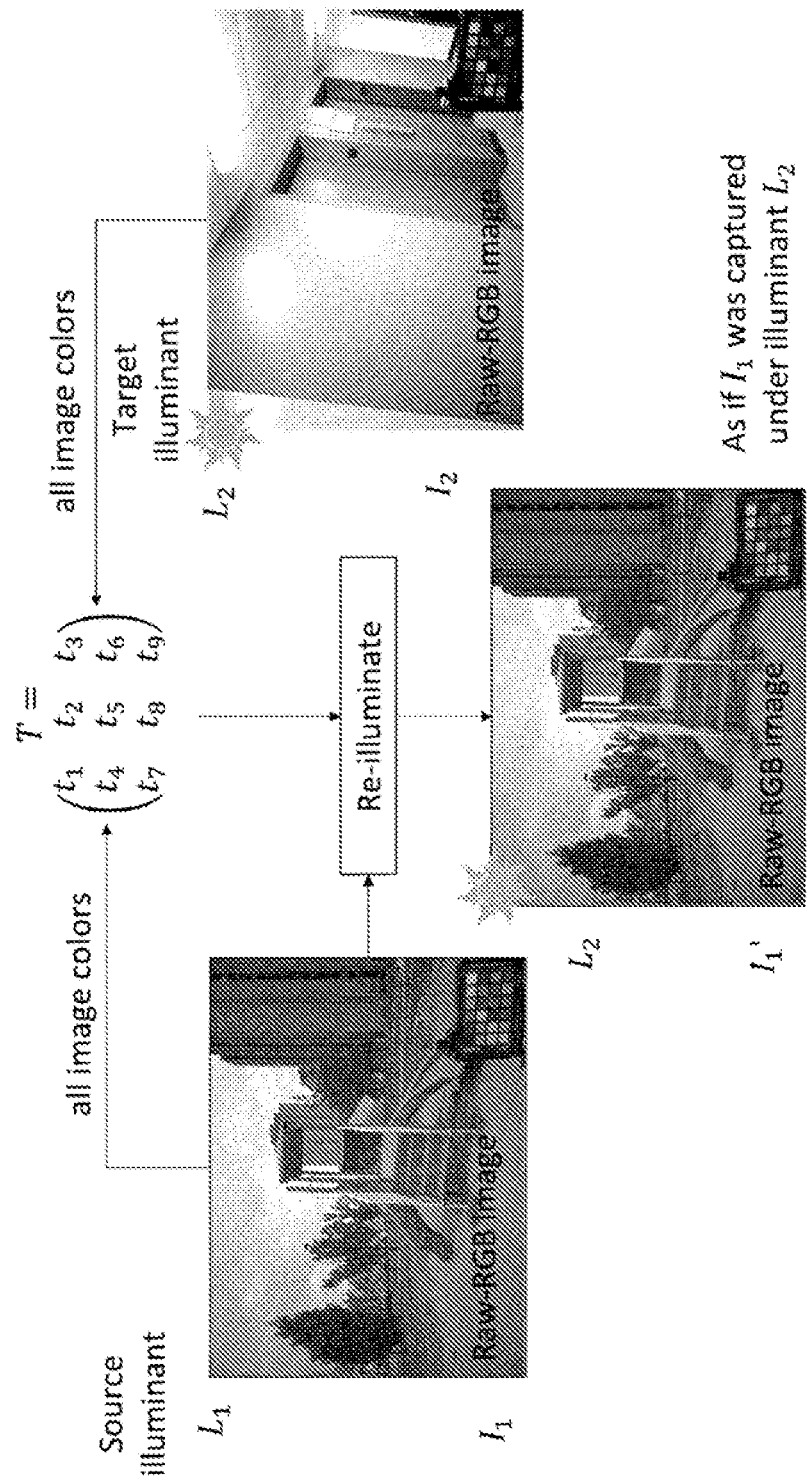
FIG. 11 illustrates a data augmentation process based on full matrix transformation between images according to an embodiment.

However, the data augmentation process is not limited to the method of using the color rendition charts as shown in FIG. 9, and different data augmentation methods may be applied as shown in FIGS. 10 and 11.

FIG. 10 illustrates a data augmentation process based on a diagonal transformation between illuminants according to an embodiment.

Referring to FIG. 10, a source illuminant $L_1$[$r_1$, $g_1$, $b_1$] and a target illuminant $L_2$[$r_2$, $g_2$, $b_2$] are identified from images $I_1$ and $I_2$ that are captured by the same camera (e.g., the first camera 111). A color transformation between the source illuminant $L_1$[$r_1$, $g_1$, $b_1$] and the target illuminant $L_2$[$r_2$, $g_2$, $b_2$] may be obtained as follows:

$$\begin{bmatrix} r2/r1 & 0 & 0 \\ 0 & g2/g1 & 0 \\ 0 & 0 & b2/b1 \end{bmatrix}$$

The color transformation is applied to image $I_1$ to change neutral color values of image $I_1$ and thereby to obtain mage $I_1'$ which appears to be captured under the target illuminant $L_2$[$r_2$, $g_2$, $b_2$]. Image $I_1'$ as well as image $I_1$ may be used to train the neural network.

FIG. 11 illustrates a data augmentation process based on a full matrix transformation between images according to an embodiment.

In an embodiment shown in FIG. 11, a color transformation matrix T is obtained using all image colors of image $I_1$ and all image colors of Image $I_2$, unlike the embodiment of FIG. 9 in which the color chart values extracted from images $I_1$ and $I_2$ are used to calculate the color transformation matrix T.

According to the embodiment shown in FIG. 11, a color rendition chart may be omitted from images $I_1$ and $I_2$, and instead, images $I_1$ and $I_2$ may be required to capture a scene having a wide distribution of colors. Also, the color transformation matrix T may be computed individually for each image pair.

Figure 12:
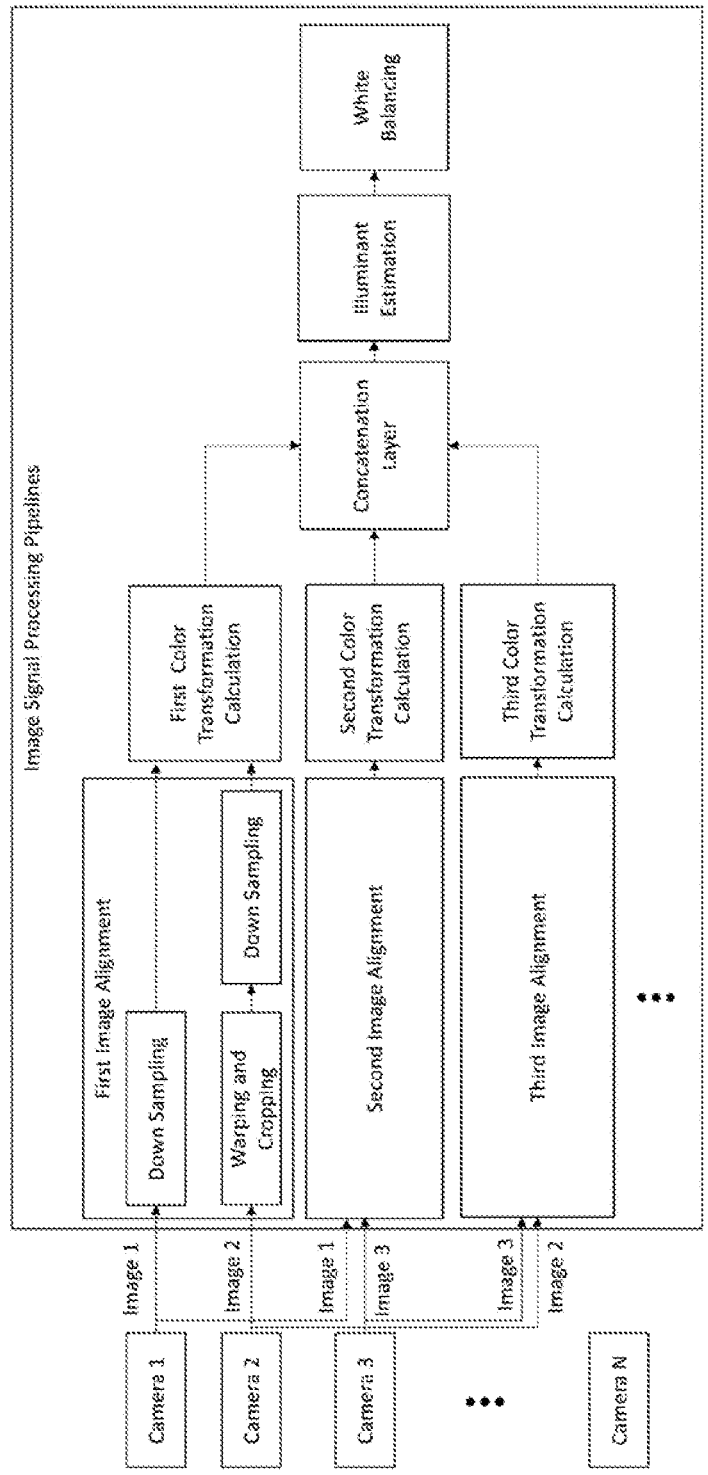
FIG. 12 is a diagram of a system for performing image processing using more than two cameras according to an embodiment.

FIG. 12 is a diagram of a system for performing image processing using more than two cameras according to an embodiment.

When there are N cameras (wherein N>2), $$\binom{N}{2}$$

3×3 color transformation matrices are constructed independently using the process described with reference to FIG. 1. The $$\binom{N}{2}$$

color transformation matrices are then concatenated and fed as input to the neural network. In particular, the feature vector that is input to the network is of the size of $$\binom{N}{2}$$

×9.

In detail, referring to FIG. 12, image 1, image 2, and image 3 are captured by camera 1, camera 2, and camera 3, respectively. The camera 1, camera 2 and camera 3 may have different focal lengths and lens configurations. Also, the camera 1, camera 2 and camera 3 may have different spectral sensitivities and therefore may provide different spectral measurements of the physical scene.

According to an embodiment, an image n (i.e., n<N), which is input image of Image Alignment shown in FIG. 12, may be the raw image n. According to another embodiment, the image n may be obtained by using converting matrix (e.g., RGB=[matrix]*RYB) to the raw image n.

The image 1 and the image 2 are re aligned with each other and down-sampled for calculation of a first color transformation between the down-sampled image 1 and the aligned and down-sampled image 2.

The image 1 and the image 3 are aligned with each other and down-sampled for calculation of a second color transformation between the down-sampled image 1 and the aligned and down-sampled image 3.

The image 2 and the image 3 are aligned with each other and down-sampled for calculation of a third color transformation between the down-sampled image 2 and the aligned and down-sampled image 3.

The first color transformation, the second color transformation, and the third color transformation are concentrated at a concatenation layer, and then are fed as input to a neural network for estimating the scene illumination.

Each of the first color transformation, the second color transformation, and the third color transformation may be a 3×3 matrix. The neural network may have an input layer having 27 nodes for receiving 27 parameters of the concatenated matrices, an output layer having 2 nodes for outputting a 2D chromaticity value for correcting color values of the image 1, and a set of hidden layers located between the input layer and the output layer.

Figure 13:
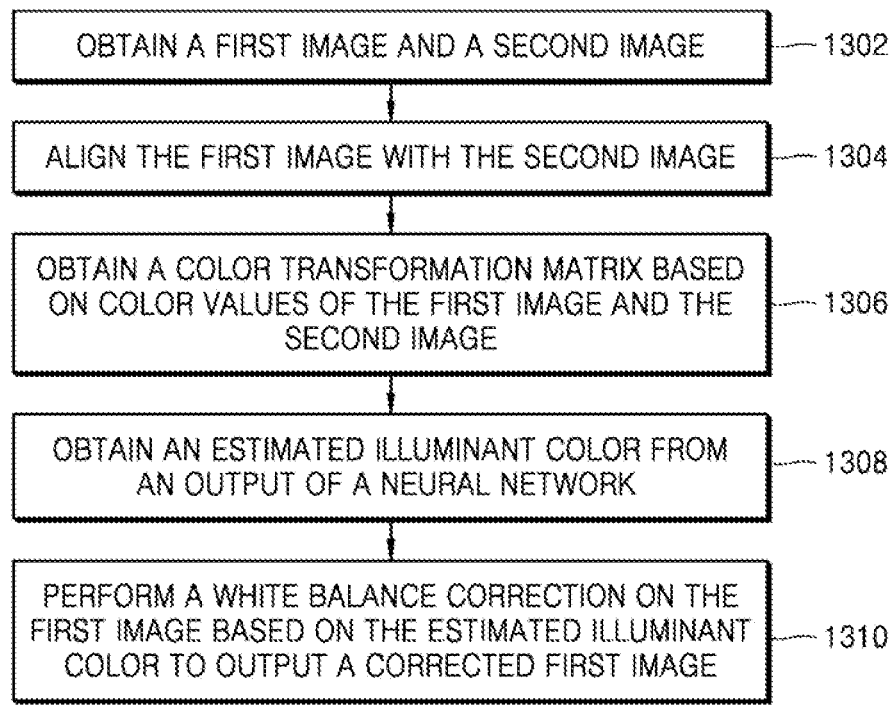
FIG. 13 is a flowchart for a method of an apparatus according to an embodiment.

FIG. 13 is a flowchart for a method of an apparatus according to an embodiment. In operation 1302, the apparatus obtains a first image and a second image that capture a same scene in different views, from a first camera and a second camera (e.g., a first camera 111 and a second camera 112 shown in FIG. 1), respectively. In operation 1304, the apparatus spatially aligns the first image with the second image. In operation 1306, the apparatus obtains a color transformation matrix that maps the first image to the second image based on color values of the first image and the second image. In operation 1308, the apparatus obtains an estimated illuminant color from an output of a neural network (e.g., a neural network shown in FIG. 4) by inputting the color transformation matrix to the neural network, wherein the neural network is trained based on a pair of reference images of a same reference scene with a color rendition chart (e.g., a color rendition chart shown in FIG. 7) that are captured by different cameras having different spectral sensitivities. In operation 1310, the apparatus performs a white balance correction on the first image based on the estimated illuminant color to output a corrected first image.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

What is claimed is:

1. An apparatus for processing image data, the apparatus comprising:
    a memory storing instructions; and
    a processor configured to execute the instructions to:
        obtain a first image and a second image that capture a same scene in different views, from a first camera and a second camera, respectively;
        spatially align the first image with the second image;
        obtain a color transformation matrix that maps the first image to the second image based on color values of the first image and the second image;
        obtain an estimated illuminant color from an output of a neural network by inputting the color transformation matrix to the neural network, wherein the neural network is trained based on a pair of reference images of a same reference scene with a color rendition chart that are captured by different cameras having different spectral sensitivities; and
        perform a white balance correction on the first image based on the estimated illuminant color to output a corrected first image.

2. The apparatus of claim 1, wherein the neural network is trained to minimize a loss between the estimated illuminant color and a ground-truth illuminant color, and
    wherein the ground-truth illuminant color is obtained from a color value of at least one achromatic patch in the color rendition chart.

3. The apparatus of claim 1, wherein the second image shows a wider view of the same scene than the first image, and
    wherein the processor is further configured to execute the instructions to:
    crop the second image to have a same view as the first image, to spatially align the first image with the cropped second image.

4. The apparatus of claim 1, wherein the processor is further configured to execute the instructions to:
    down-sample the first image to obtain a down-sampled first image;
    down-sample the second image to obtain a down-sampled second image; and
    compute the color transformation matrix that maps the down-sampled first image to the down-sampled second image based on color values of the down-sampled first image and the down-sampled second image.

5. The apparatus of claim 1, wherein the color transformation matrix is a three-by-three matrix that maps RGB values of the first image to RGB values of the second image.

6. The apparatus of claim 1, wherein the output of the neural network represents a ratio of RGB values of the estimated illuminant color.

7. The apparatus of claim 1, wherein the neural network is further trained using augmented images, and
    wherein the augmented images are obtained by re-illuminating a first reference image and a second reference image of different scenes under different illuminations that are captured by a same reference camera, based on color transformations between first color chart values of the first reference image and second color chart values of the second reference image.

8. The apparatus of claim 1, wherein the neural network is further trained using augmented images, and
    wherein the augmented images are obtained by re-illuminating a first reference image and a second reference image of different scenes under different illuminations that are captured by a same reference camera, based on color transformations between all color values of the first reference image and all color values of the second reference image.

9. The apparatus of claim 1, wherein the color transformation matrix is a first color transformation matrix,
    the processor is further configured to execute the instructions to:
        obtain, from a third camera, a third image that captures the same scene in a view different from the views of the first image and the second image;
        spatially align the first image with the third image;
        spatially align the second image with the third image;
        obtain a second color transformation matrix that maps the first image to the third image based on the color values of the first image and color values of the third image;
        obtain a third color transformation matrix that maps the second image to the third image based on the color values of the second image and the color values of the third image;
        concatenate the first, the second, and the third color transformation matrices to obtain a concatenated matrix;
        obtain the estimated illuminant color from the output of the neural network by inputting the concatenated matrix to the neural network; and
        performing the white balance correction on the first image based on the estimated illuminant color to output the corrected first image.

10. The apparatus of claim 1, wherein the apparatus is a user device in which the first camera and the second camera are mounted, and
    wherein the first camera and the second camera have different fields of view and different spectral sensitivities.

11. The apparatus of claim 1, the apparatus is a server comprising a communication interface configured to communicate with a user device comprising the first camera and the second camera, to receive the first image and the second image from the user device.

12. A method for processing image data, the method comprising:
    obtaining a first image and a second image that capture a same scene in different views, from a first camera and a second camera, respectively;
    spatially aligning the first image with the second image;
    obtaining a color transformation matrix that maps the first image to the second image based on color values of the first image and the second image;

obtaining an estimated illuminant color from an output of a neural network by inputting the color transformation matrix to the neural network, wherein the neural network is trained based on a pair of reference images of a same reference scene with a color rendition chart that are captured by different cameras having different spectral sensitivities; and performing a white balance correction on the first image based on the estimated illuminant color to output a corrected first image.

13. The method of claim 12, wherein the neural network is trained to minimize a loss between the estimated illuminant color and a ground-truth illuminant color, and wherein the ground-truth illuminant color is obtained from a color value of at least one achromatic patch in the color rendition chart.

14. The method of claim 12, wherein the second image shows a wider view of the same scene than the first image, and wherein the method further comprises:

cropping the second image to have a same view as the first image, to spatially align the first image with the cropped second image.

15. The method of claim 12, wherein the method further comprises:

down-sampling the first image to obtain a down-sampled first image;

down-sampling the second image to obtain a down-sampled second image; and computing the color transformation matrix that maps the down-sampled first image to the down-sampled second image based on color values of the down-sampled first image and the down-sampled second image.

16. The method of claim 12, wherein the color transformation matrix is a three-by-three matrix that maps RGB values of the first image to RGB values of the second image.

17. The method of claim 12, wherein the neural network is further trained using augmented images, and wherein the augmented images are obtained by re-illuminating a first reference image and a second reference image of different scenes under different illuminations that are captured by a same reference camera, based on color transformations between first color chart values of the first reference image and second color chart values of the second reference image.

18. The method of claim 12, wherein the neural network is further trained using augmented images, and wherein the augmented images are obtained by re-illuminating a first reference image and a second reference image of different scenes under different illuminations that are captured by a same reference camera, based on color transformations between all color values of the first reference image and all color values of the second reference image.

19. A non-transitory computer readable storage medium storing a program to be executable by at least one processor to perform a method for processing image data, the method comprising:

obtaining a first image and a second image that capture a same scene in different views, from a first camera and a second camera, respectively;

spatially aligning the first image with the second image;

obtaining a color transformation matrix that maps the first image to the second image based on color values of the first image and the second image;

obtaining an estimated illuminant color from an output of a neural network by inputting the color transformation matrix to the neural network, wherein the neural network is trained based on a pair of reference images of a same reference scene with a color rendition chart that are captured by different cameras having different spectral sensitivities; and performing a white balance correction on the first image based on the estimated illuminant color to output a corrected first image.

20. The non-transitory computer readable storage medium of claim 19, wherein the output of the neural network represents a ratio of RGB values of the estimated illuminant color.

* * * * *